(12) United States Patent
Roth

(10) Patent No.: US 10,951,964 B2
(45) Date of Patent: *Mar. 16, 2021

(54) REDUCED CROSSTALK PHOTONIC SWITCH

(71) Applicant: Juniper Networks, Inc., Sunnyvale, CA (US)

(72) Inventor: Jonathan Edgar Roth, San Francisco, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/839,597

(22) Filed: Apr. 3, 2020

(65) Prior Publication Data

US 2020/0236448 A1 Jul. 23, 2020

Related U.S. Application Data

(63) Continuation of application No. 16/267,446, filed on Feb. 5, 2019, now Pat. No. 10,645,474, which is a
(Continued)

(51) Int. Cl.
*H04J 14/00* (2006.01)
*H04Q 11/00* (2006.01)
*G02B 6/35* (2006.01)
*H04B 10/548* (2013.01)
*G02F 1/313* (2006.01)

(52) U.S. Cl.
CPC ....... *H04Q 11/0005* (2013.01); *G02B 6/3546* (2013.01); *G02B 6/3588* (2013.01); *G02F 1/3136* (2013.01); *H04B 10/548* (2013.01); *H04Q 2011/0015* (2013.01); *H04Q 2011/0049* (2013.01)

(58) Field of Classification Search
CPC ....... H04Q 11/0005; H04Q 2011/0049; H04Q 2011/0015; G02B 6/3588; G02B 6/3546; H04B 10/548
USPC .......................................................... 398/51
See application file for complete search history.

(56) References Cited

U.S. PATENT DOCUMENTS 6,473,541 B1 10/2002 Ho
10,244,297 B1 3/2019 Roth
(Continued)

FOREIGN PATENT DOCUMENTS

CN 110278497 A 9/2019

OTHER PUBLICATIONS

"U.S. Appl. No. 15/920,769, Notice of Allowance dated Nov. 5, 2018", 10 pgs.
(Continued)

*Primary Examiner* — Don N Vo
(74) *Attorney, Agent, or Firm* — Schwegman Lundberg & Woessner, P.A.

(57) ABSTRACT

Described are various configurations of reduced crosstalk optical switches. Various embodiments can reduce or entirely eliminate crosstalk using a coupler that has a power-splitting ratio that compensates for amplitude imbalance caused by phase modulator attenuation. Some embodiments implement a plurality of phase modulators and couplers as part of a dilated switch network to increase overall bandwidth and further reduce potential for crosstalk.

20 Claims, 8 Drawing Sheets

Related U.S. Application Data continuation of application No. 15/920,769, filed on Mar. 14, 2018, now Pat. No. 10,244,297.

(56) References Cited

U.S. PATENT DOCUMENTS

| | | | |
|---|---|---|---|
| 10,645,474 B2* | 5/2020 | Roth | G02B 6/3546 |
| 2004/0085612 A1 | 5/2004 | Livingston et al. | |
| 2005/0123260 A1 | 6/2005 | Liu et al. | |
| 2005/0213103 A1 | 9/2005 | Everett et al. | |
| 2006/0133815 A1* | 6/2006 | Fukashiro | H04B 10/25253 |
| | | | 398/147 |
| 2012/0039565 A1 | 2/2012 | Klein et al. | |
| 2013/0343694 A1 | 12/2013 | Akimoto et al. | |
| 2015/0331309 A1 | 11/2015 | Hsueh et al. | |
| 2016/0334575 A1* | 11/2016 | Graves | G02B 6/126 |
| 2016/0380711 A1 | 12/2016 | Feigin | |
| 2017/0099529 A1 | 4/2017 | Dupuis et al. | |
| 2017/0115514 A1* | 4/2017 | Rad | G02F 1/0121 |
| 2019/0007155 A1* | 1/2019 | Grammel | H04Q 11/0005 |
| 2019/0049666 A1 | 2/2019 | Welch | |
| 2019/0289373 A1 | 9/2019 | Roth | |

OTHER PUBLICATIONS

"U.S. Appl. No. 16/267,446, Non Final Office Action dated Sep. 13, 2019", 9 pgs.

"U.S. Appl. No. 16/267,446, Notice of Allowance dated Jan. 31, 2020", 5 pgs.

"U.S. Appl. No. 16/267,446, Response filed Dec. 20, 2019 to Non Final Office Action dated Sep. 13, 2019", 8 pgs.

"European Application Serial No. 18215255.3, Extended European Search Report dated Jul. 11, 2019", 5 pgs.

"European Application Serial No. 18215255.3, Response filed Mar. 17, 2020 to Extended European Search Report dated Jul. 11, 2019", 2 pgs.

Besse, Pierre A., et al., "New 2×2 and 1×3 Multimode Interference Couplers with Free Selection of Power Splitting Ratios", Journal of Ligittwave Technology, vol. 14, No. 10, Oct. 1996, (1996), 2286-2293.

Cheng, Qixiang, et al., "Scalable, Low-Energy Hybrid Photonic Space Switch", Journal of Lightwave Technology, vol. 31, No. 18, (Sep. 15, 2013), 3077-3084.

Dupuis, Nicolas, et al., "Impact of Topology on the Scalability of Mach-Zehnder-based Multistage Silicon Photonic Switch Networks", Journal of Lightwave Technology, vol., No., 2017, (2017), 11 pgs.

Dupuis, Nicolas, et al., "Ultralow crosstalk nanosecond-scale nested 2×2 Mach-Zehnder silicon photonic switch", vol. 41, No. 13 / Jul. 1, 2016 / Optics Letters, (Jun. 23, 2016), 3002-3005.

Jinguji, K., et al., "Mach-Zehnder Interferometer Type Wavelength-Flattened Coupling Optical Waveguide Coupler With Ratio", Electronic Letters vol. 26 No. 17; Aug. 16, 1990, 1326-1327, (1990), 2 pgs.

Lagali, Neil S., et al., "Analysis of Generalized Mach-Zehnder Interferometers for Variable-Ratio Power Splitting and Optimized Switching", Journal of Lightwave Technology, vol. 17, No. 12, (Dec. 1999), 2542-2550.

Lee, Benjamin G., et al., "Silicon Photonic Switch Fabrics in Computer Communications Systems", Journal of Lightwave Technology, vol. 33, No. 4, (Feb. 15, 2015), 768-777.

Leuthold, Luerg, et al., "All-Optical Space Switches with Gain and Principally Ideal Extinction Ratios", IEEE Journal of Quantum Electronics, vol. 34, No. 4, (Apr. 1998), 622-633.

Lu, Liangjun, et al., "Broadband 4×4 Nonblocking Silicon Electrooptic Switches Based on Mach-Zehnder Interferometers", IEEE Photonics Journal; vol. 7, No. 1, (Feb. 2015), 9 pgs.

Nikolova, Dessislava, et al., "Scaling silicon photonic switch fabrics for data center interconnection networks", Optical Society of America, (2015), 17 pgs.

Soref, R. A., et al., "Electrooptical Effects in Silicon", IEEE Journal of Quantum Electronics, vol. QE-23(1), (Jan. 1987), 123-129.

Suzuki, Keijiro, et al., "Ultra-high-extinction-ratio 2×2 silicon optical switch with variable splitter", Optical Society of America, (2015), 7 pgs.

* cited by examiner

REDUCED CROSSTALK PHOTONIC SWITCH

PRIORITY

This application is a continuation of U.S. application Ser. No. 16/267,446, filed Feb. 5, 2019, which is a continuation of U.S. application Ser. No. 15/920,769, filed Mar. 14, 2018, which is incorporated by reference herein in its entirety.

TECHNICAL FIELD

The present disclosure generally relates to switches for switching networks, and more particularly to reduced crosstalk optical switches.

BACKGROUND

Some communication networks, such as those used in data centers, route communications between devices using a network of switches. In some networks, the switches are Mach-Zehnder optical switches that use phase modulators and couplers, adjust the phase modulators' state to select which switch input and output ports are connected, and route light carrying signals to end devices (e.g., client device, a server). A Mach-Zehnder optical switch can split incoming light into components routed down multiple paths. The Mach-Zehnder optical switch then uses one or more phase modulators to create constructive or deconstructive interference in an output coupler at the potential output paths in order to select where the light is routed. Crosstalk between different light beams traversing the network of switches can arise due to the physical characteristics of the couplers and phase modulators, and can increase as light passes through successive switching nodes. Further, current approaches for reducing crosstalk, e.g., low-attenuation thermal switches, are power-hungry and cannot be implemented in network architectures that have a large number of switches, such as a modern optical switch network.

BRIEF DESCRIPTION OF THE DRAWINGS

To easily identify the discussion of any particular element or act, the most significant digit or digits in a reference number refer to the figure ("FIG.") number in which that element or act is first introduced.

DETAILED DESCRIPTION

Figure 1:
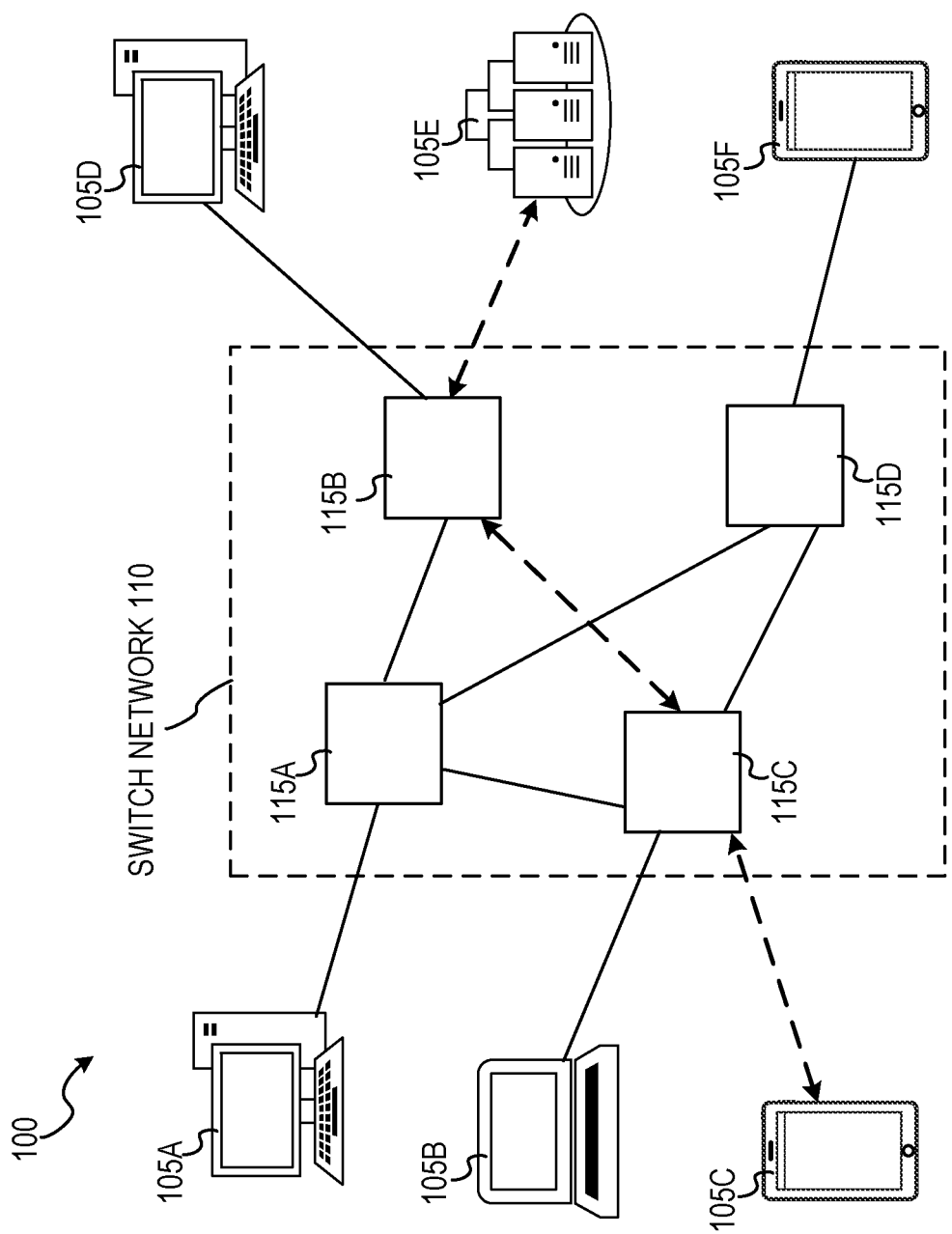
FIG. 1 shows a network architecture implementing reduced crosstalk switches, according to some example embodiments.

The description that follows includes systems, methods, techniques, and instruction sequences that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

An optical packet switch is a reconfigurable, low-latency optical routing network component used in some data communication networks. Some switch networks (e.g., using Benes or Banyan architectures) can be implemented using photonic integrated circuit (PIC) technology. One example of a switch component used within a switch network is a 2×2 Mach Zehnder Interferometer (MZI), which uses a coupler to split an incoming light beam into multiple beams, each directed down different paths. One or more phase modulators are used to create phase differences between the beams on the different paths. A second coupler is used to interfere the beams on multiple paths and couple the beams to output ports. The phase differences cause constructive and destructive interference at several possible output paths, determining to which path the signal is routed. A 2×2 MZI has two input and two output ports, and uses one or more phase modulators to switch between its "cross" and "bar" transmission states.

Generally, the radix count (quantity of ports) of a switch network is limited by the crosstalk, insertion loss, and power consumption of the implemented switches. Further, the total crosstalk and insertion loss for a given switch network can be calculated from summing contributions from all the components in an optical path through the switch network. As a component in an optical packet switch, an MZI has quantifiable crosstalk and insertion loss.

Herein, when referring to an individual switch, crosstalk is the ratio of the power of light beams exiting two output ports, where the light beams originates at a single input port. One of the output ports is the intended path. The switch is configured such that the port of the intended path is a constructive port of the output coupler, and the second output port is a destructive port of the output coupler. Further, in the context of switch networks that include multiple light beams and multiple switches along an optical path, crosstalk is the ratio of the power of a light beam at an output port or along an optical path to the total power of another light beam at the same location in the switch network due to individual switches' crosstalk.

Crosstalk can stem from several potential sources within a given switch. Some sources include couplers with mistargeted splitting ratios, and waveguides fabricated with insufficient tolerances that cause random variations in insertion loss or optical path length. An additional source of crosstalk includes amplitude change caused by phase modulator elements. In silicon photonics modulators using carrier plasma modulation, a change in phase is accompanied by a change in insertion loss. The change in insertion loss causes an amplitude imbalance in light beams that interfere at the output coupler of the MZI, which leads to crosstalk. Silicon modulators based on the carrier plasma dispersion effect can operate at frequencies in the GHz range and can be used in optical packet switches. Fast modulation in PICs can also be accomplished by modulators that use the quantum-confined Stark effect or the Franz-Keldysh effect; however, these suffer the same amplitude imbalance issue when used in switches. The amplitude imbalance puts a lower limit on the attainable crosstalk in a switching element, and further limits the size of the overall packet switch.

While some thermal phase modulators exhibit little to no amplitude imbalance, thermal phase modulators have high power consumption and have slow rise/fall times (e.g., a microsecond), thus limiting their usefulness in packet switching.

To this end, an improved switch that is specially configured to optimize the split ratios of a coupler can be implemented to cancel out crosstalk due to amplitude imbalance caused by absorption from the switch's phase modulator. In some embodiments, light that has been phase shifted from the phase modulators is input into a multimode interference component (MMI), such as a 2×2 MMI. The MMI is fabricated with tapered sides such that the power splitting ratio compensates for amplitude imbalance. The configured power splitting ratio results in perfect or near-perfect deconstructive interference on one output of a 2×2 MMI. The improved switch can be integrated into high-radix count switch networks to eliminate crosstalk between different light beams traversing the network.

Herein, the term beam is interpreted electromagnetic waves (e.g., light, optical signal) that can travel down a channel (e.g., waveguide, a fiber optic cable). Beams can be coded to carry one or more signals, e.g., data streams. Beams can be separated (e.g., split) into components. The components of a beam are in themselves beams, each of which may include one or more signals of the original beam. Unless specified, routing, splitting, phase shifting or otherwise modifying is a manipulation of the beam itself, not the underlying one or more signals that a given beam may carry. For example, if a beam is split into two component beams, each of the two component beams may include all signals in the original beam or a portion of the signals in the original beam.

FIG. 1 shows an example network architecture 100 implementing reduced crosstalk switches, according to some example embodiments. The network architecture 100 comprises a plurality of endpoints 105A-105F devices (e.g., computers such as a laptop, desktop, or server in a datacenter) that send light data back and forth over an optical switch network 110. The optical switch network 110 comprises a plurality of switches 115A-115D that route light carrying signals between the plurality of endpoints 105A-105F. For example, as shown in FIG. 1, endpoint device 105C (a tablet) and endpoint device 105E (a datacenter) are transmitting information via switch 115C and switch 115B, as illustrated by the dashed-arrows between the endpoints.

Although only four switches 115A-115D are illustrated in FIG. 1, the optical switch network 110 can include a multitude of switches to increase the overall bandwidth of the network 110. Further, each switch may comprise multiple sub-component switches as part of a dilated switch, as discussed in further detail below. The plurality of switches 115A-115D can simultaneously route multiple light carrying signals between the plurality of endpoints 105A-105F. As discussed, one possible source of crosstalk is an amplitude imbalance within a switch leading to incomplete destructive interference, causing noise on a "victim" signal due to unintended crosstalk from an "aggressor" signal. For instance a 2×2 MZI switch operating in the "bar" state may have a small fraction of light passing through the "cross" state. In some example embodiments, one or more of the plurality of switches 115A-115D have phase modulators and MMI couplers that are configured to cancel out amplitude imbalances caused by the phase modulators. Eliminating amplitude imbalance in a power-efficient way reduces crosstalk in the optical switch network 110, thereby allowing the optical switch network 110 to integrate more switches and route larger amounts of information between a larger number of endpoints.

Figure 2:
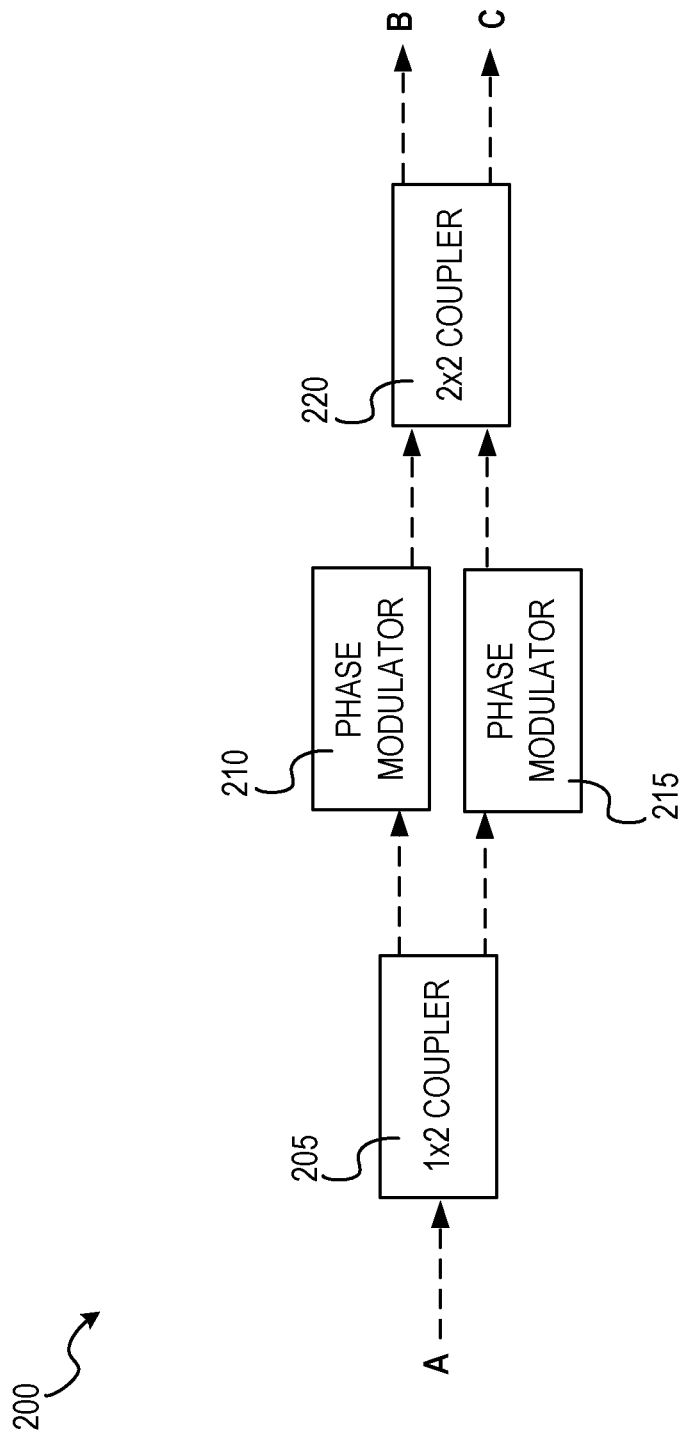
FIG. 2 shows a Mach-Zehnder Interferometer (MZI) reduced crosstalk switch, according to some example embodiments.

FIG. 2 shows an example reduced crosstalk switch 200, according to some example embodiments. The switch 200 is configured as a 1×2 Mach-Zehnder Interferometer (MZI) switch that uses symmetric couplers, with three ports: A, B, and C. Although the switch 200 can operate in either direction (i.e., light is input into the 1×2 coupler 205 and output at 2×2 coupler 220, or vice versa), the below discussion assumes light traverses the switch 200 from left to right (i.e., light is input into port A and emanates from ports B and/or C).

As illustrated in FIG. 2, a 1×2 coupler 205 has one input port (port A) and two output ports (unlabeled ports connected to phase modulators 210 and 215). In some example embodiments, the 1×2 coupler 205 is a 1×2 MMI or waveguide Y-junction. Each of the output ports of 1×2 coupler 205 outputs to respective phase modulators, phase modulator 210 and phase modulator 215. The phase modulators 210 and 215 output to a 2×2 coupler 220, which has two input ports and two output ports. In some example embodiments, the 2×2 coupler 220 is a 2×2 MMI. The dotted lines connecting the respective components of the architecture of switch 200 are channels for light data, e.g., waveguides, fiber optics.

With reference to FIG. 2, a "phase arm" refers to components that make up a path along the top or bottom of switch 200 between optical couplers 205 and 220.

The phase modulators 210 and 215 can have phase shifts adjusted to determine whether all the light entering (or exiting) port A exits (or enters) via port B, whether a fraction of light exits (or enters) both ports B and C, or whether all light from port A exits (or enters) via port C. In some example embodiments, a light beam is input into port A of the 1×2 coupler 205 and is symmetrically split into a top output and bottom output of 1×2 coupler 205. Each of the output beams of 1×2 coupler 205 have identical phases and 50% of the original power (e.g., 50% power of the light input into port A). The phase modulators 210 and 215 can phase shift the light such that when the light is coupled in the 2×2 coupler 220, the difference in phases causes deconstructive interference at one output port of the 2×2 coupler 220 and constructive interference at the other output port.

In some example embodiments, the switch 200 operates in two states, where in each state, only one of the phase modulators is turned on. In a first state, phase modulator 215 is turned on and has a phase shift, applied to the light, of $\pi/2$, and phase modulator 210 is off and has zero phase shift. In the first state, all the light input into switch 200 exits the top output B of switch 200 due to the two beams constructively interfering at port B and destructively interfering at port C. In a second state, phase modulator 215 is off and has zero phase shift while phase modulator 210 is turned on and has $\pi/2$ phase shift. In the second state, all the light input into switch 200 exits port C due to the signals constructively interfering at port C and destructively interfering at port B.

If the amplitudes of the components of the light entering the two inputs of the 2×2 coupler 220 are the same, then for the correct phase shift perfect deconstructive interference occurs in the port B or C for which no light is intended to exit. However, if the amplitudes of the two components of the light entering the two inputs of the 2×2 coupler 220 are not the same, complete destructive interference will not occur, leading to crosstalk. Further, some phase modulators with desirable characteristics (e.g., power efficient, GHz response times) have an absorption of the light being phase shifted that varies with the amount of phase shift, thereby causing amplitude imbalance in the 2×2 coupler 220 and crosstalk.

Figure 3:
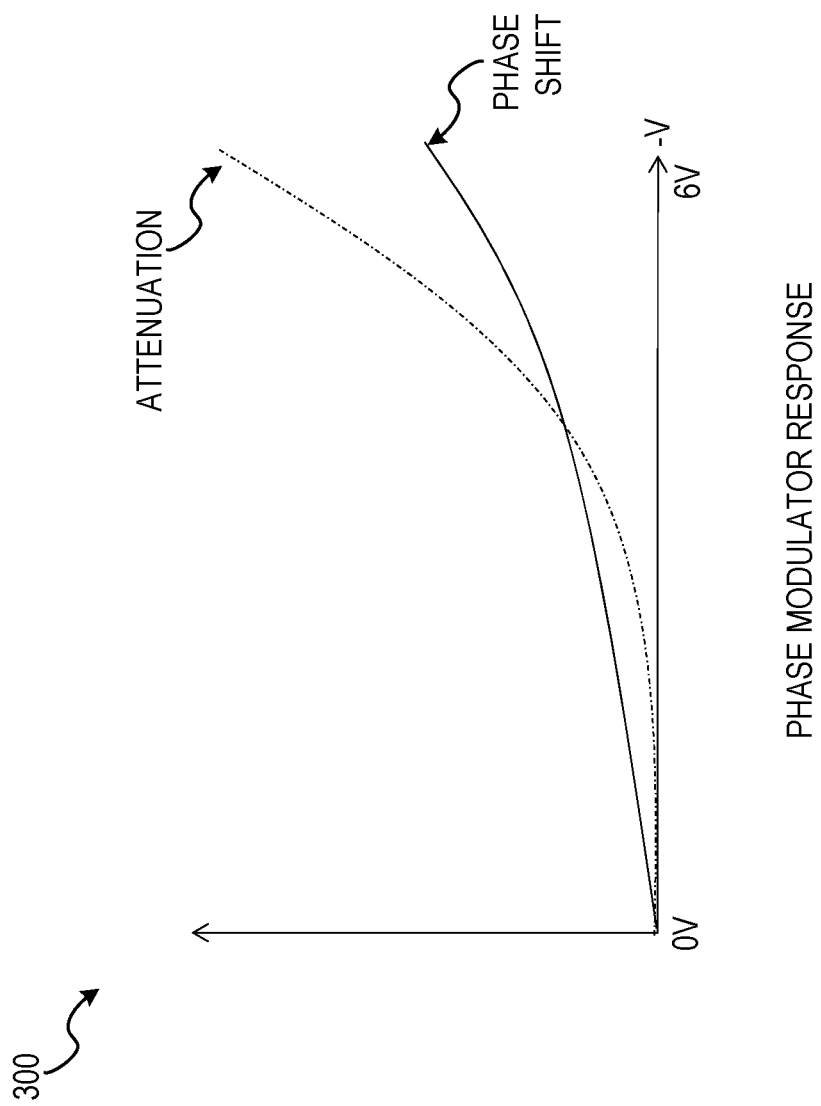
FIG. 3 shows a response graph of a multiple quantum well (MQW) modulator, according to some example embodiments.

FIG. 3 shows an example response graph 300 of a multiple quantum well (MQW) modulator, according to some example embodiments. Multiple quantum well (MQW) modulators modulate the phase and amplitude of light by changing the complex refractive index of the modulator by changing an applied electric field. As illustrated, as the MQW modulator increasingly shifts the phase of light, the amplitude of the light is increasingly attenuated. Returning to FIG. 2, thus if phase modulator 210 is a MQW modulator and turned on with a π/2 phase shift, the amplitude of the phase-shifted light will be lower than the non-phase-shifted light being passed through phase modulator 215.

In some example embodiments, light traversing the switch 200 can be modeled using transfer matrices. A column vector is shown in Expression 1:

$$\begin{bmatrix} 1 \\ j \end{bmatrix} \quad \text{Ex. 1}$$

Expression 1 represents the amplitudes and relative phases of light in the waveguide modes at a cross-section along the switch 200, or at the input or output of a coupler. In some example embodiments, the number of elements of the column vector is the same as the number of waveguides at that cross-section, and each waveguide is assumed to carry light in only a fundamental mode.

The 1×2 coupler 205 can be modeled as a transfer matrix that splits an input mode (e.g., light input into 1×2 coupler 205) into two modes having the same phase, as will occur in a 1×2 MMI or a waveguide Y-junction. In some example embodiments, the input of the 1×2 coupler 205 is as follows:

$$\frac{1}{\sqrt{2}} \begin{bmatrix} 1 \\ 1 \end{bmatrix} \quad \text{Ex. 2}$$

If operating on an input field distribution to create an output field distribution, the output field (e.g., two modes in two waveguides) is a function of the input field (e.g., one mode in one waveguide). That is:

$$\begin{bmatrix} E_{out}^1 \\ E_{out}^2 \end{bmatrix} = \frac{1}{\sqrt{2}} \begin{bmatrix} 1 \\ 1 \end{bmatrix} [E_{in}^1] \quad \text{Ex. 3}$$

As is appreciated by one of ordinary skill in the art, Kramers-Kronig analysis can yield expressions for change in absorption and phase as a function of carrier density in silicon. Applied here, operating at 1310 nm: (1) dn=−7.7625e−023*N^1.05−4.7863e−018*P^0.805; and (2) dabs (1/cm)=1.7925E−20*N.^1.14+5.9858E−20*P.^1.1. N and P represent electron and hole densities per cm³.

The phase modulator arms can be set to use two operating states which have phase shifts of (0, π/2) and (π/2, 0). The field transmission coefficient of a modulator with π/2 phase shift, relative to that of a modulator with zero phase shift, will be given by t. For the two operating states, the transfer matrix of the phase modulator arms will be:

$$\begin{bmatrix} 1 & 0 \\ 0 & jt \end{bmatrix}, \begin{bmatrix} jt & 0 \\ 0 & 1 \end{bmatrix} \quad \text{Ex. 4}$$

Where, in Expression 4:

$$j=\sqrt{-1}=e^{j\pi/2} \quad \text{Ex. 5}$$

The transfer matrix of the output 2×2 coupler 220, if implemented with an MMI using a 50% splitting ratio, is as follows:

$$\frac{1}{\sqrt{2}} \begin{bmatrix} 1 & -j \\ -j & 1 \end{bmatrix} \quad \text{Ex. 6}$$

The transfer matrices of a switch in the two operating states for light entering the left side (into 1×2 coupler 205) are as follows:

$$\frac{1}{\sqrt{2}} \begin{bmatrix} 1 & -j \\ -j & 1 \end{bmatrix} \begin{bmatrix} 1 & 0 \\ 0 & jt \end{bmatrix} \frac{1}{\sqrt{2}} \begin{bmatrix} 1 \\ 1 \end{bmatrix},$$

$$\frac{1}{\sqrt{2}} \begin{bmatrix} 1 & -j \\ -j & 1 \end{bmatrix} \begin{bmatrix} jt & 0 \\ 0 & 1 \end{bmatrix} \frac{1}{\sqrt{2}} \begin{bmatrix} 1 \\ 1 \end{bmatrix} \quad \text{Ex. 7}$$

Expression 7 can be simplified to:

$$\frac{1}{2} \begin{bmatrix} 1+t \\ jt-j \end{bmatrix}, \frac{1}{2} \begin{bmatrix} jt-j \\ 1+t \end{bmatrix} \quad \text{Ex. 8}$$

If there is no loss, then t=1 and the expressions simplify to:

$$\begin{bmatrix} 1 \\ 0 \end{bmatrix}, \begin{bmatrix} 0 \\ 1 \end{bmatrix}.$$

With loss, the crosstalk (in dB) in both switch states is as follows:

$$20*\log 10\left(\frac{1+t}{1-t}\right) \quad \text{Ex. 9}$$

As described with light entering the switch 200 through the side with a single port (i.e., into port A), the switch will be configured such that one of the two output ports (e.g., port B, port C) is the intended output port and the constructive port, and any light exiting the destructive port causes crosstalk. If the switch 200 is operated in the opposite direction with two distinct light beams entering the two ports on the same side (i.e., port B and C), only one of the two signals will be intentionally passed to the single port (i.e., port A) on the opposite side. Any portion of the other light beam exiting the single port on the opposite side will cause crosstalk.

In some example embodiments, the phase modulators (e.g., phase modulators 210 and 215) are based on the carrier plasma dispersion effect and can modulate light by changing the complex refractive index of the modulator based on quantities of charge carriers (e.g., N and P) injected into the semiconductor material of the modulator. If phase modulators 210 and 215 are carrier-plasma-dispersion-based modulators, when operating at 1310 nm, and if phase modulator 210 and phase modulator 215 are each 100 microns long, carriers are injected into the phase modulators 210, 215 so that the N and P concentrations are ~1.7E18/cm^3, which yields a shift of $\pi/2$ in one arm, while the other arm is in an off-state, according to some example embodiments. The resulting field transmission of t is then 0.916, with an insertion loss of 0.77 db in the modulating phase arm. Further, the crosstalk in this configuration is 27.1 db.

The crosstalk of the architecture 100 of switch 200 can be eliminated if the power splitting ratio of the 2×2 coupler 220 is specially configured. For a rectangular 2×2 coupler, also known as a multimode interferometer (MMI), several power splitting ratios can be obtained, as is appreciated by those of ordinary skill in the art:

$$\frac{P_c}{P_b} \cong \left\{ \frac{50}{50}, \frac{100}{0}, \frac{85}{15}, \frac{72}{28} \right\} \qquad \text{Ex. 10}$$

where $P_c$ is the power output of one output port of the 2×2 coupler 220, and $P_b$ is the power output from the other port of the 2×2 coupler 220.

According to some example embodiments, while some phase modulators (such as MQW modulators or carrier-plasma-dispersion effect-based phase modulators) are power efficient, they can cause attenuation in the phase-shifted light, causing an amplitude imbalance between channels entering a coupler in which light in the channels undergoes interference, and subsequent crosstalk at the output of the coupler. Making matters worse, modern optical switching networks require a large number of successive switch stages, thereby increasing the potential for crosstalk. Crosstalk in such a network cannot simply be fixed by implementing phase modulators that do not attenuate (such as thermal-based phase modulators). This is due to low-attenuation phase modulators requiring appreciable amounts of power to operate, and implementing those phase modulators in a high radix count network would result in a power-hungry, commercially impractical architecture.

Figure 4:
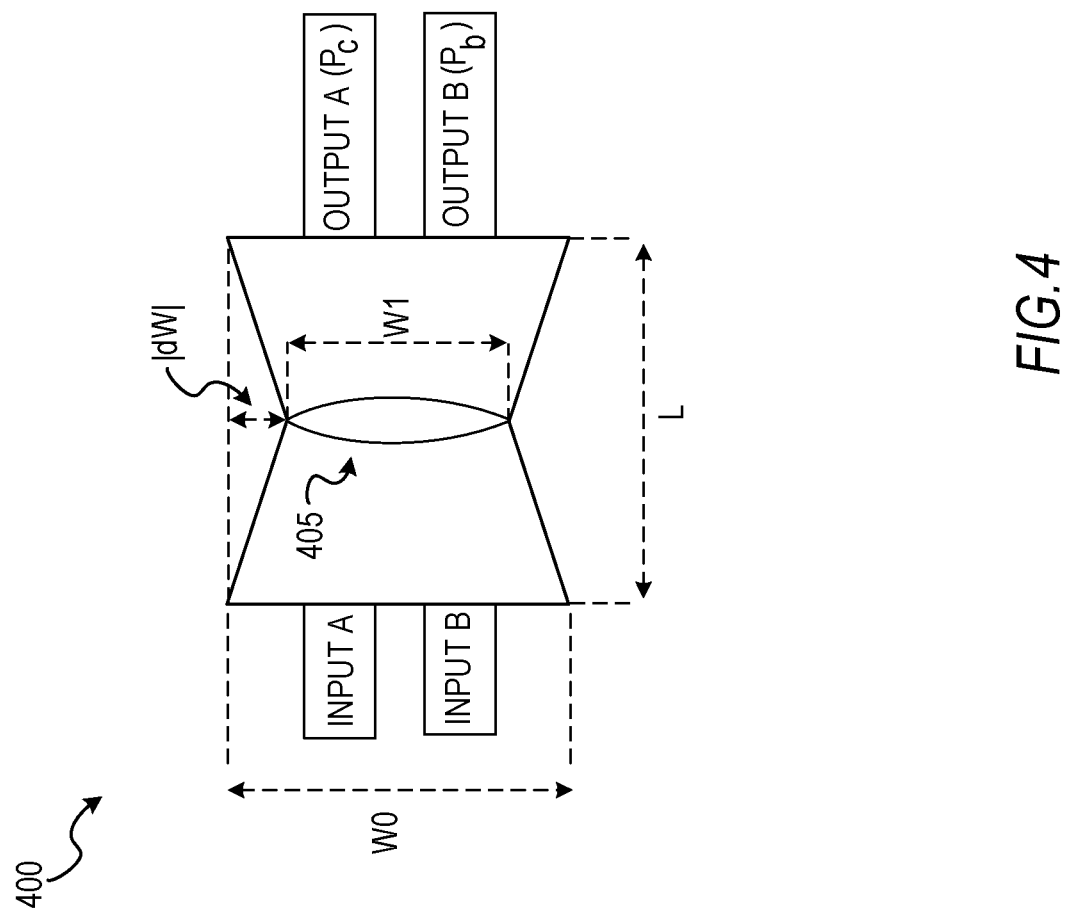
FIG. 4 shows a coupler that can be integrated into an optical switch to compensate for phase-modulator-based attenuation, according to some example embodiments.

FIG. 4 shows an example coupler 400 that can be integrated into an optical switch to compensate for phase modulator-based attenuation, according to some example embodiments. Coupler 400 is a 2×2 optical coupler with a length L and width W0, and two inputs and outputs, including input A, output A, input B, and output B. Generally, coherent light can be input into input A and/or input B, mix or interfere, and emanate from output A and/or output B depending on the phase differences and amplitudes of the inputs. For example, if the light entering inputs A and B are of the same amplitude but there is a difference in phase of $\pi/2$, then constructive interference may occur for output A, which represents a high-signal, whereas deconstructive interference may occur for output B, representing low-signal. By controlling the relative phases of the light at the two inputs to the coupler, the input light can be routed to one output or the other.

As illustrated, the coupler 400 has a tapered midsection, with both its sides offset (e.g., indented) from the sides of a rectangle coupler by a distance |dW|. Further, the coupler 400 has a gap 405 of width W1. The tapered sides and gap 405 of coupler 400 can be configured to vary the power splitting ratio of the coupler 400 due to path differences of light in superposition in the coupler 400. In particular, the normalized power "$P_c$" of output A may be:

$$P_c = \cos(0.5 \cdot \pi \cdot d\Omega)^2 \qquad \text{Ex. 11}$$

where $d\Omega$ is normalized width variation. The normalized power of the other output "$P_b$" is then: $P_b = 1 - P_c$. Further, the normalized width variation, $d\Omega$, depends on the width of the input face of coupler 400, $W_0$, and the taper, dW:

$$d\Omega = -\left(\frac{dW}{dW_0}\right) - \frac{1}{2} \qquad \text{Ex. 12}$$

In some example embodiments, the splitting ratio can be configured to compensate for loss in phase arms which may be connected to the coupler. The cross power splitting ratio, S, of the 2×2 coupler 220 may be configured as given in Expression 13, in which the field transmission t refers to the ratio of the field transmission coefficient of a phase modulator with $\pi/2$ phase shift to that of a phase modulator with zero phase shift:

$$S = \frac{t^2}{1+t^2} \qquad \text{Ex. 13}$$

Expression 13 leads to a transfer matrix of the 2×2 coupler 220 as follows:

$$\frac{1}{\sqrt{1+t^2}} \begin{bmatrix} 1 & -jt \\ -jt & 1 \end{bmatrix} \qquad \text{Ex. 14}$$

In some example embodiments, in a first switch state, the phase modulator 210 has a phase shift of $\pi/2$, whereas the phase modulator 215 has a phase shift of zero (e.g., an off-state). In a second switch state, the phase modulator 210 is in an off-state, and the phase modulator 215 has a phase shift of $\pi/2$. The transfer matrix of the switch 200 in the two switch states simplifies to these expressions in which all of the transmitted light exits only one port, so that there will be no crosstalk $$\sqrt{\frac{1+t^2}{2}} \begin{bmatrix} 1 \\ 0 \end{bmatrix}, \sqrt{\frac{1+t^2}{2}} \begin{bmatrix} 0 \\ 1 \end{bmatrix} \qquad \text{Ex. 15}$$

If operated in the reverse direction, e.g., as a 2×1 coupler, the transfer matrices in the two switch states are:

$$\frac{1}{\sqrt{2}} \begin{bmatrix} 1 & 1 \end{bmatrix} \begin{bmatrix} 1 & 0 \\ 0 & jt \end{bmatrix} \frac{1}{\sqrt{(1+t^2)}} \begin{bmatrix} 1 & -jt \\ -jt & 1 \end{bmatrix}, \qquad \text{Ex. 16}$$

$$\frac{1}{\sqrt{2}} \begin{bmatrix} 1 & 1 \end{bmatrix} \begin{bmatrix} jt & 0 \\ 0 & 1 \end{bmatrix} \frac{1}{\sqrt{(1+t^2)}} \begin{bmatrix} 1 & -jt \\ -jt & 1 \end{bmatrix}$$

Expression 16 simplifies as follows, showing that there is no crosstalk when operating as a 2×1 coupler:

$$\sqrt{\frac{1+t^2}{2}}\begin{bmatrix}1 & 0\end{bmatrix}, \sqrt{\frac{1+t^2}{2}}\begin{bmatrix}0 & 1\end{bmatrix} \qquad \text{Ex. 17}$$

In some example embodiments, the switch 200 may only have 1 phase modulator. That is, two beam components are output from 1×2 coupler 205, and one of the beam components is input into the only phase modulator (e.g., phase modulator 210) in switch 200, and the beams are coupled in 2×2 coupler 220 to compensate for phase modulator caused imbalance. In some embodiments only having one phase modulator, the beam components output from 1×2 coupler 205 will have an uneven splitting ratio.

Figure 5:
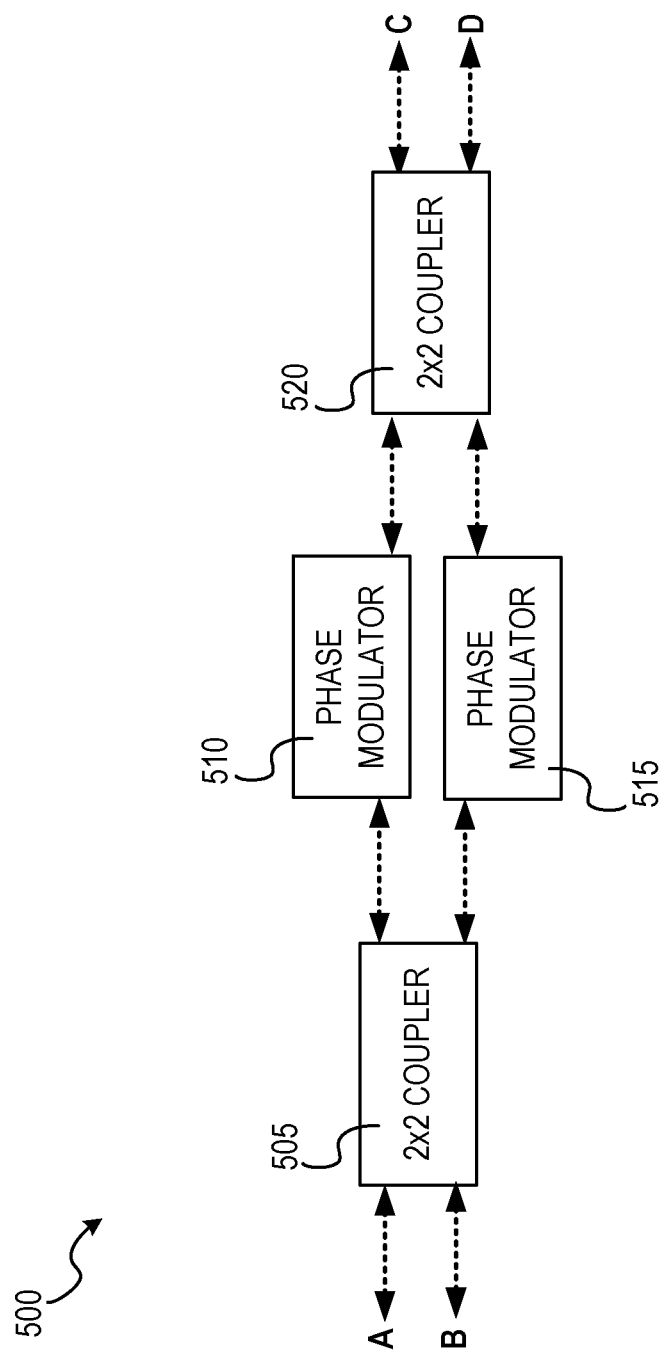
FIG. 5 shows a switch architecture with two couplers, according to some example embodiments.

FIG. 5 shows a switch 500 with two 2×2 couplers 505, 520, according to some example embodiments. In switch 500, two light beams are input into a 2×2 coupler 505 (e.g., one light beam is input into port A, another light beam is input into port B). The 2×2 coupler 505 outouts into two phase modulators 510 and 515. The two phase modulators 510 and 515 output into another 2×2 coupler 520. In FIG. 5, a "phase arm" refers to components that make up a path along the top or bottom of switch 500 between 2×2 couplers 505 and 520.

In switch 500, if both the bottom and top phase arms are of the same length and both phase arms are in an off state (e.g., phase modulators 510 and 515 are off), there is perfect cross coupling if the sum of the split ratios of the two couplers is 100%. However, when switch 500 is manufactured, fabrication imperfections can arise that lead to amplitude imbalance and crosstalk. In some embodiments, one or more of the couplers of switch 500 can be tuned by varying the coupling ratio to compensate for fabrication imperfections. In some example embodiments, this tuning can be achieved using the coupler with a tapered midsection shown in FIG. 4. In particular, for example, 2×2 coupler 520 can be tuned to create a cross power splitting ratio given by the following expression, in which t is the ratio of field transmission coefficients from a phase modulator with n phase shift to that of a phase modulator with zero phase shift:

$$S = \frac{t}{1+t} \qquad \text{Ex. 18}$$

Couplers with cross power splitting ratios S & 1-S can exhibit transfer matrices as follows:

$$\frac{1}{\sqrt{1+t}}\begin{bmatrix}1 & -j\sqrt{t}\\ -j\sqrt{t} & 1\end{bmatrix}, \frac{1}{\sqrt{1+t}}\begin{bmatrix}\sqrt{t} & -j\\ -j & \sqrt{t}\end{bmatrix} \qquad \text{Ex. 19}$$

With the couplers 505 and 520 placed in series, separated by a lossless pair of equal length phase arms expressed by the matrix $$\begin{bmatrix}1 & 0\\ 0 & 1\end{bmatrix},$$

the transfer matrix of the resulting switch 500 is that of a cross state with no crosstalk, independent of field transmission value of t, where t is assumed to be a non-negative real number, $$-j\begin{bmatrix}0 & 1\\ 1 & 0\end{bmatrix}.$$

If one of the phase arms is modulated so that the phase shifts between the arms are separated by 180° (e.g., (0,π)), and if the ratio of field transmission of the modulated arm at 180° phase shift to that with the modulated arm at 0° phase shift is t, the transfer matrix of the phase section will be:

$$\begin{bmatrix}1 & 0\\ 0 & -t\end{bmatrix}.$$

Further, the transmission of the switch 500 is then:

$$\frac{1}{\sqrt{1+t}}\begin{bmatrix}1 & -j\sqrt{t}\\ -j\sqrt{t} & 1\end{bmatrix}\begin{bmatrix}1 & 0\\ 0 & -t\end{bmatrix}\frac{1}{\sqrt{1+t}}\begin{bmatrix}\sqrt{t} & -j\\ -j & \sqrt{t}\end{bmatrix} \qquad \text{Ex. 20}$$

Expression 20 simplifies to:

$$\frac{1}{1+t}\begin{bmatrix}\sqrt{t}(1+t) & j(t^2-1)\\ 0 & -\sqrt{t}(1+t)\end{bmatrix} \qquad \text{Ex. 21}$$

If input modes are $$\begin{bmatrix}1\\ 0\end{bmatrix} \text{ and } \begin{bmatrix}0\\ 1\end{bmatrix},$$

the output modes are $$\begin{bmatrix}\sqrt{t}\\ 0\end{bmatrix} \text{ and } -\begin{bmatrix}j(1-t)\\ \sqrt{t}\end{bmatrix}.$$

For the first mode, $$\begin{bmatrix}1\\ 0\end{bmatrix},$$

there is no crosstalk. It is possible to avoid crosstalk from the second mode $$\begin{bmatrix}0\\ 1\end{bmatrix},$$

if the other arm in the phase section is modulated to a 180° phase shift with field transmission of t, expressed by transfer matrix $$\begin{bmatrix} 1 & 0 \\ 0 & -t \end{bmatrix}.$$

In this case the transmission of the switch 500 is then:

$$\frac{1}{1+t}\begin{bmatrix} -\sqrt{t}(1+t) & 0 \\ j(t^2-1) & \sqrt{t}(1+t) \end{bmatrix} \quad \text{Ex. 22}$$

If the switch is operated in the reverse direction (e.g., light traverses from 2×2 coupler 520, through phase modulators 510 and 515, and is output from 2×2 coupler 505), the first state of the phase section is expressed as $$\begin{bmatrix} 1 & 0 \\ 0 & -t \end{bmatrix},$$

and the transmission of the switch 500 is as follows:

$$\frac{1}{1+t}\begin{bmatrix} \sqrt{t}(1+t) & 0 \\ j(t^2-1) & -\sqrt{t}(1+t) \end{bmatrix} \quad \text{Ex. 23}$$

In the reverse direction embodiment, light entering switch 500 in the reverse direction in mode $$\begin{bmatrix} 0 \\ 1 \end{bmatrix}$$

will nave no crosstalk.

According to some example embodiments, switch 500 can operate in three different states: a passive cross state, a first bar state, and a second bar state. In some example embodiments, configuring switch 500 to operate in one of the three states may be useful in network architectures in which not all possible paths are carrying signals at the same time. In the following discussion, A→D can be interpreted as a light beam traversing from port A to port D across the entire switch 500 (e.g., through superposition in couplers 505 and 520, etc.)

In the passive cross state, light can traverse from A→D or from D→A. Similarly, light can traverse from B→C and from C→B. In the cross state, both phase modulators 510 and 515 are in an off state and crosstalk does not occur.

In the first bar state, phase modulator 510 operates at a 180° phase shift, phase modulator 515 is off, and field transmission is t: a bar state. In the first bar state, light traversing C→A and B→D does not have crosstalk. On the other hand, light traversing A→C and D→B exhibits crosstalk due to imbalance.

In the second bar state, phase modulator 515 operates at 180° phase shift, phase modulator 510 is off, and field transmission is t: bar state. In the second bar state, light traversing A→C and D→B does not have crosstalk. On the other hand, light traversing C→A and B→D exhibits crosstalk due to imbalance.

In either first and second bar states, the crosstalk in dB is:

$$20*\log10\left(\frac{\sqrt{t}}{1-t}\right) \quad \text{Ex. 24}$$

This is an improvement over approaches implementing 50% couplers (i.e., instead of split ratios S & 1-S), where the crosstalk for all input states is higher regardless of which arms are modulated:

$$20*\log10\left(\frac{1+t}{1-t}\right) \quad \text{Ex. 25}$$

In some example embodiments, phase modulators 510 and 515 are carrier-injection-based modulators 150 microns in length. In those embodiments, to implement a 180-degree phase shift, carriers are injected so that the N and P concentrations are ~2.3E18/cm^3, which results in a field transmission of t=0.830, and insertion loss of 1.61 db in the modulating phase arm. If couplers 505 and 520 are 50% couplers, the crosstalk in the bar state for both inputs is 20.7 db.

In some example embodiments, couplers 505 and 520 use power splitting ratios of 1/(1+t) and t/(1+t) respectively. In those embodiments, one or both of phase modulators 510, 515 can be tapered to compensate for imbalance, as discussed above. In those embodiments, in one direction there will be optimally zero crosstalk, while in the other direction crosstalk of 14.6 db can occur.

In some example embodiments, the 2×2 switch 500 is configured as a 1×2 switch by removing one of the ports and one of the phase modulators. Control of the modified 2×2 switch architecture is simplified compared to switch architecture 200 (a 1×2 switch embodiment) because there is one less phase modulator to manage. In these example embodiments, a light beam traversing the path in which the phase modulator was removed may traverse from the initial coupler (e.g., coupler 505) to the other coupler (e.g., coupler 520) via a passive optical waveguide without traversing a phase modulator.

Figure 6:
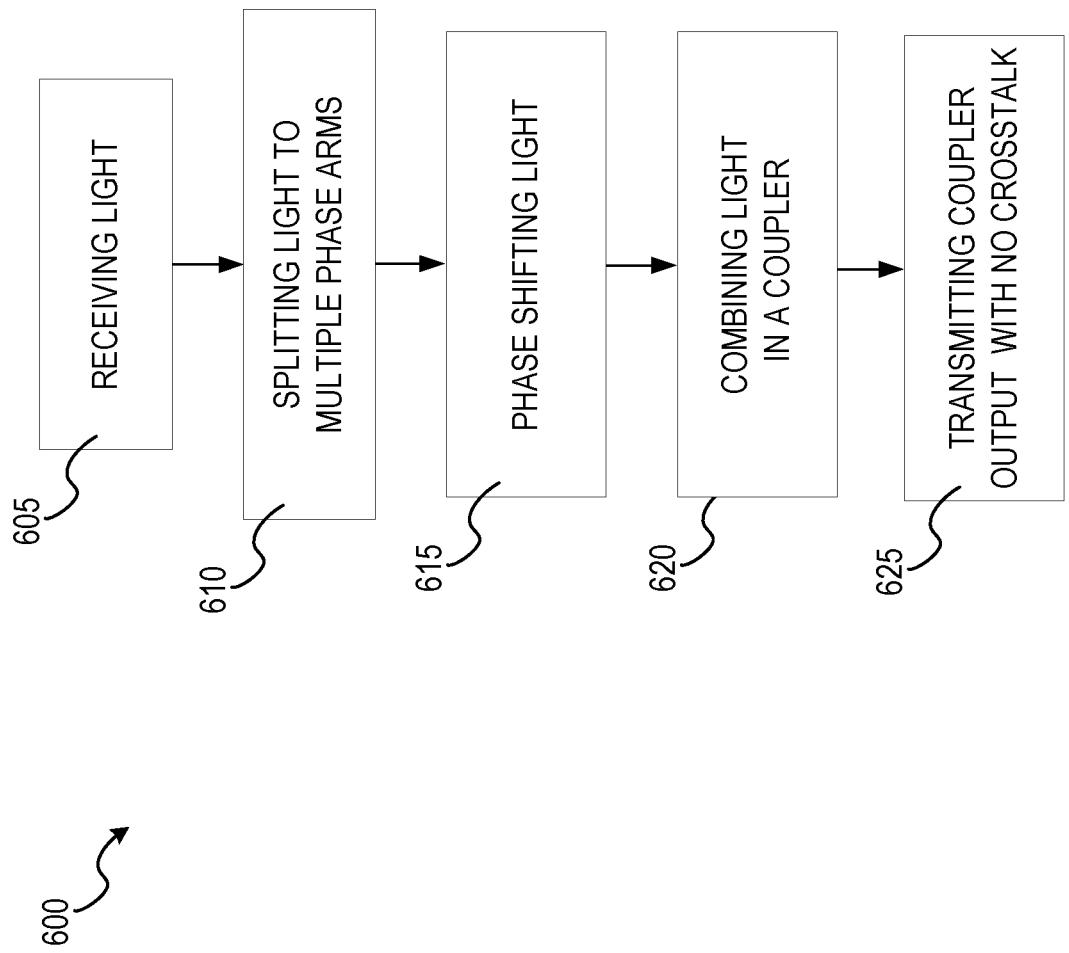
FIG. 6 shows a flow diagram of a method for routing light through a reduced crosstalk switch, according to some example embodiments.

FIG. 6 shows a flow diagram of a method 600 for routing light through a reduced crosstalk switch, according to some example embodiments. In some example embodiments, a single switch (e.g., switch 200, switch 500) implements method 600, while in some example embodiments a switch network (e.g., dilated switch 800 of FIG. 8, discussed below) implements method 600.

At operation 605, a coupler receives light, e.g., one or more beams of light. For example, with reference to FIG. 5, coupler 505 receives a first beam at port A and a second beam at port B. At operation 610, the coupler 605 routes the one or more received beams of light onto multiple phase arms. For example, with reference to FIG. 5, 2×2 coupler outputs light onto a top phase arm and bottom phase arm of switch 500, as discussed above.

At operation 615, light on the phase arms is phase-shifted using one or more phase modulators. For example, phase modulator 510 is a carrier-injection-based phase shifter configured to phase-shift light on the top phase arm by π/2, as discussed above. Further, in some example embodiments, while phase modulator 510 is configured to impart a phase-shift, phase modulator 515 is in an off state and light on the bottom phase arm retains its initial phase. At operation 220, the light on the top and bottom phase arms are combined in a second coupler that has been configured to compensate for attenuation caused by modulation. Continuing the example, if phase modulator 510 is a carrier-injection-based phase modulator, the modulated light on the top phase arm may be attenuated relative to the light on the bottom phase arm. To compensate for the attenuation, the second coupler has a splitting ratio, (e.g., $t^2/(1+t^2)$) that compensates for the attenuation in the light on the top phase arm. At operation 625, the second coupler transmits a low-crosstalk output at one or more output ports. For example, if the second coupler has two output ports, due to attenuation compensation, complete destructive interference may occur for one output port and complete constructive interference may occur for one of the output ports.

Figure 7:
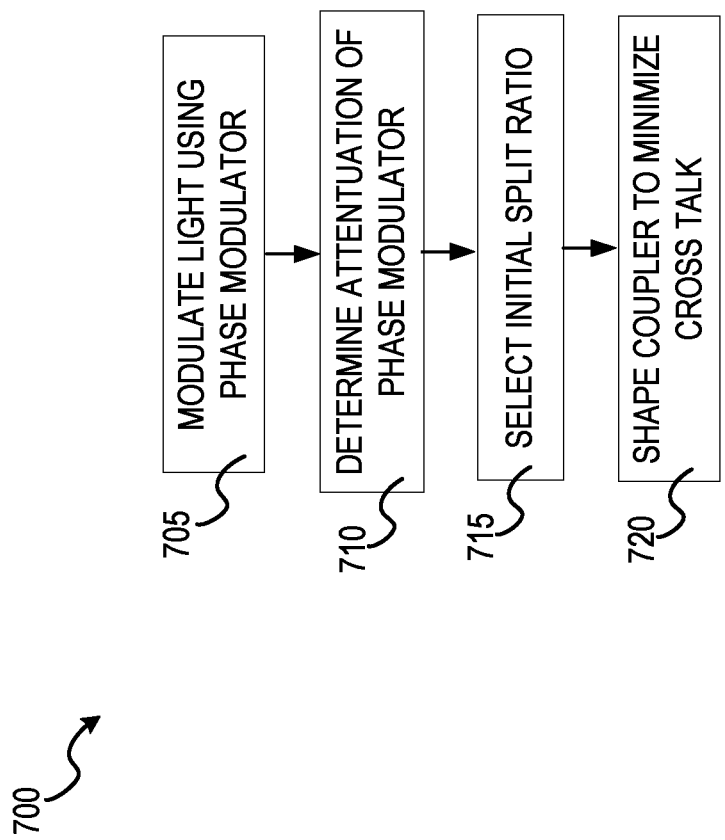
FIG. 7 shows a flow diagram of a method for fabricating a power-efficient reduced crosstalk optical switch, according to some example embodiments.

FIG. 7 shows a flow diagram of a method 700 for fabricating a power-efficient reduced crosstalk optical switch, according to some example embodiments. At operation 705, a phase modulator phase-shifts light. At operation 710, the modulated light is analyzed to determine an amount of attenuation caused by the phase modulator. At operation 715, an initial split ratio for a coupler is selected. For example, if the coupler is a rectangular coupler, a split ratio of $P_c/P_b$=50/50 is selected from the possible split ratios (see Expression 10, above). At operation 720, the coupler is shaped to minimize crosstalk. For example, if the coupler is a rectangular coupler, the midsection of the coupler can be increasingly tapered by a distance |dW| until the initial split ratio becomes the split ratio (e.g., $t^2/(1+t^2)$). In some example embodiments, which split ratio is selected and increasingly modified depends on different design considerations, including, for example: optical beam strengths, radix count, phase modulator type, amount of attenuation.

Figure 8:
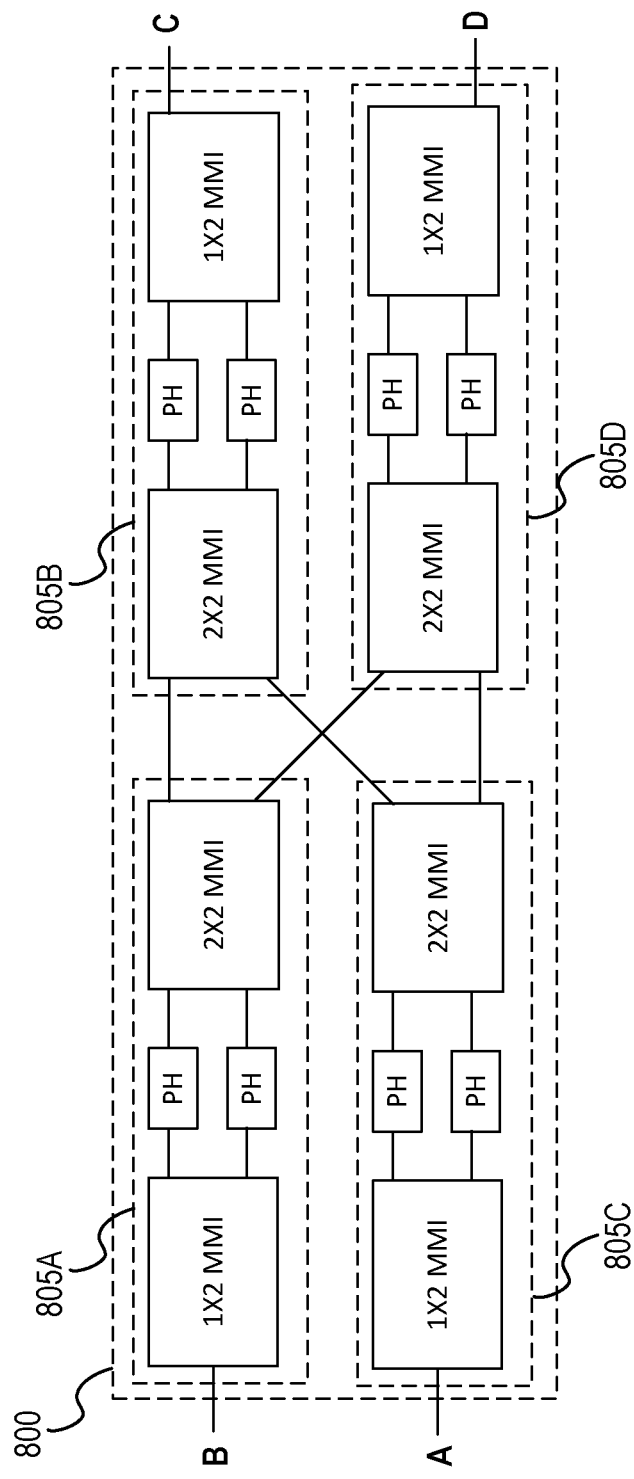
FIG. 8 shows a dilated switch that can be used to reduce crosstalk, according to some example embodiments.

FIG. 8 shows an example dilated switch 800 that can be used to reduce crosstalk, according to some example embodiments. As illustrated, dilated switch 800 comprises multiple switch sub-components 805A-805D, each of which is an individual switch, such as switch 200 or 500. Dilated switch 800 can lower or eliminate crosstalk by ensuring that only one light beam carrying signal traverses any of the sub-switch components at once. To that end, as the radix count is increased, additional sub-component switches can be added to dilate the overall switch architecture and reduce or eliminate potential for crosstalk. In some example embodiments, to maintain efficient power consumption as the radix count and sub-switch count are increased, one or more of the sub-switches implement carrier-injection-based phase modulators and shaped couplers as explained above. In this way, optical switch network 110 can increase its port count and subsequent bandwidth while being power efficient and keeping crosstalk low.

What is claimed is:

1. A method for routing light using an optical switch, the method comprising:
    receiving light at the optical switch, the optical switch having a physical shape that compensates for attenuation differences of internal light in the optical switch;
    generating modulated light using an optical modulator in the optical switch, the modulated light exhibiting attenuation caused by the optical modulator; and
    coupling the modulated light using the optical switch such that constructive interference occurs for a first output port of the optical switch and destructive interference occurs for a second output port of the optical switch due to the physical shape of the optical switch.

2. The method of claim 1, wherein the optical switch comprises a coupler that exhibits the physical shape that compensates for the attenuation differences of the light in the coupler.

3. The method of claim 2, wherein the coupler has tapered sides that modify a superposition of the light in the coupler.

4. The method of claim 3, wherein the superposition of the light in the coupler is modified by the tapered sides such that a power splitting ratio of the coupler compensates for attenuation differences in the light in the coupler.

5. The method of claim 4, wherein the power splitting ratio is $t^2/(1+t^2)$, where t is a ratio of field transmission coefficients of the optical modulator.

6. The method of claim 4, wherein the power splitting ratio is $t/(1+t)$, where t is a ratio of field transmission coefficients of the optical modulator.

7. The method of claim 1, wherein the optical modulator is a phase modulator that generates the modulated light using phase modulation.

8. The method of claim 7, wherein generating the modulated light comprises shifting, using the phase modulator, a phase of a portion of the light in the optical switch by approximately 90 degrees.

9. The method of claim 7, wherein generating the modulated light comprises shifting, using the phase modulator, a phase of a portion of the light in the optical switch by approximately 180 degrees.

10. The method of claim 1, wherein the optical modulator generates the modulated light based on a quantity of embedded positive and negative carriers in the optical modulator.

11. The method of claim 1, wherein the optical modulator is a first optical modulator and the optical switch comprises a second optical modulator, wherein the first optical modulator generates the modulated light while the second optical modulator is inactive.

12. The method of claim 11, wherein the second optical modulator that is inactive passes light unmodulated.

13. An optical switch for routing light, the optical switch comprising:
    an input port to receive the light;
    a first output port;
    a second output port; and
    an optical modulator configured to generate modulated light, the modulated light exhibiting attenuation caused by the optical modulator, the optical switch having a physical shape that compensates for attenuation differences by causing constructive interference occurs for a first output port of the optical switch and destructive interference occurs for a second output port of the optical switch due to the physical shape of the optical switch.

14. The optical switch of claim 13, wherein the optical switch comprises a coupler that exhibits the physical shape that compensates for the attenuation differences of the light in the coupler.

15. The optical switch of claim 14, wherein the coupler has tapered sides that modify a superposition of the light in the coupler.

16. The optical switch of claim 15, wherein the superposition of the light in the coupler is modified by the tapered sides such that a power splitting ratio of the coupler compensates for attenuation differences in the light in the coupler.

17. The optical switch of claim 13, wherein the optical modulator is a phase modulator that generates the modulated light using phase modulation.

18. The optical switch of claim 13, wherein the optical modulator generates the modulated light based on a quantity of embedded positive and negative carriers in the optical modulator.

19. The optical switch of claim 13, wherein the optical modulator is a first optical modulator, and wherein the optical switch further comprises a second optical modulator, wherein the first optical modulator generates the modulated light while the second optical modulator is inactive.

20. The optical switch of claim 19, wherein the second optical modulator that is inactive passes light unmodulated.

* * * * *